(12) United States Patent
Milner

(10) Patent No.: US 6,461,268 B1
(45) Date of Patent: Oct. 8, 2002

(54) CONTINUOUSLY VARIABLE TRANSMISSION DEVICE

(75) Inventor: Peter James Milner, Hinckley (GB)

(73) Assignee: Orbital Traction Ltd. (GB)

( * ) Notice: Subject to any disclaimer, the term of this patent is extended or adjusted under 35 U.S.C. 154(b) by 0 days.

(21) Appl. No.: 09/600,271

(22) PCT Filed: Jan. 11, 1999

(86) PCT No.: PCT/GB99/00075

§ 371 (c)(1),
(2), (4) Date: Aug. 15, 2000

(87) PCT Pub. No.: WO99/35417

PCT Pub. Date: Jul. 15, 1999

(30) Foreign Application Priority Data

| Jan. 12, 1998 | (GB) | 9801085 |
| Feb. 12, 1998 | (GB) | 9802971 |
| May 14, 1998 | (GB) | 9810269 |
| Jul. 23, 1998 | (GB) | 9815952 |
| Aug. 27, 1998 | (GB) | 9818557 |

(51) Int. Cl.$^7$ ............................................. F16H 13/06

(52) U.S. Cl. .................... 475/183; 475/186; 475/189; 475/195

(58) Field of Search ................................ 475/183–185, 475/186, 189, 193, 195

(56) References Cited

U.S. PATENT DOCUMENTS

| 3,452,622 A | * | 7/1969 | Kashihara | 475/183 |
| 3,504,574 A | * | 4/1970 | Okabe | 475/183 |
| 4,345,486 A | * | 8/1982 | Olesen | 475/183 |
| 4,856,374 A | * | 8/1989 | Kreuzer | 475/183 |
| 4,968,290 A | * | 11/1990 | Kashihara et al. | 475/193 |
| 5,129,869 A | * | 7/1992 | Sagata et al. | 475/193 |

FOREIGN PATENT DOCUMENTS

| GB | 2130314 | * | 5/1984 | 475/183 |

* cited by examiner

*Primary Examiner*—Sherry Estremsky
*Assistant Examiner*—Tisha D. Lewis
(74) *Attorney, Agent, or Firm*—Gifford, Krass, Groh, Sprinkle, Anderson & Citkowski, P.C.

(57) ABSTRACT

A continuously variable transmission device of the type having planetary members (25) in rolling contact with radially inner (23) and outer (26) races each comprising two axially spaced parts, with control means (30) for selectively varying the axial separation of the two parts of one race and thus the radial position of the planetary members (25) in rolling contact therewith, in which there are provided means sensitive to the torque applied to a drive-transmitting member of the transmission operable both to determine the compensating variation in the separation of the two parts of the other race and thus the transmission ratio of the device and to vary the forces exchanged between the planets (25) and the races (23, 26) normal to the interface between them.

26 Claims, 10 Drawing Sheets

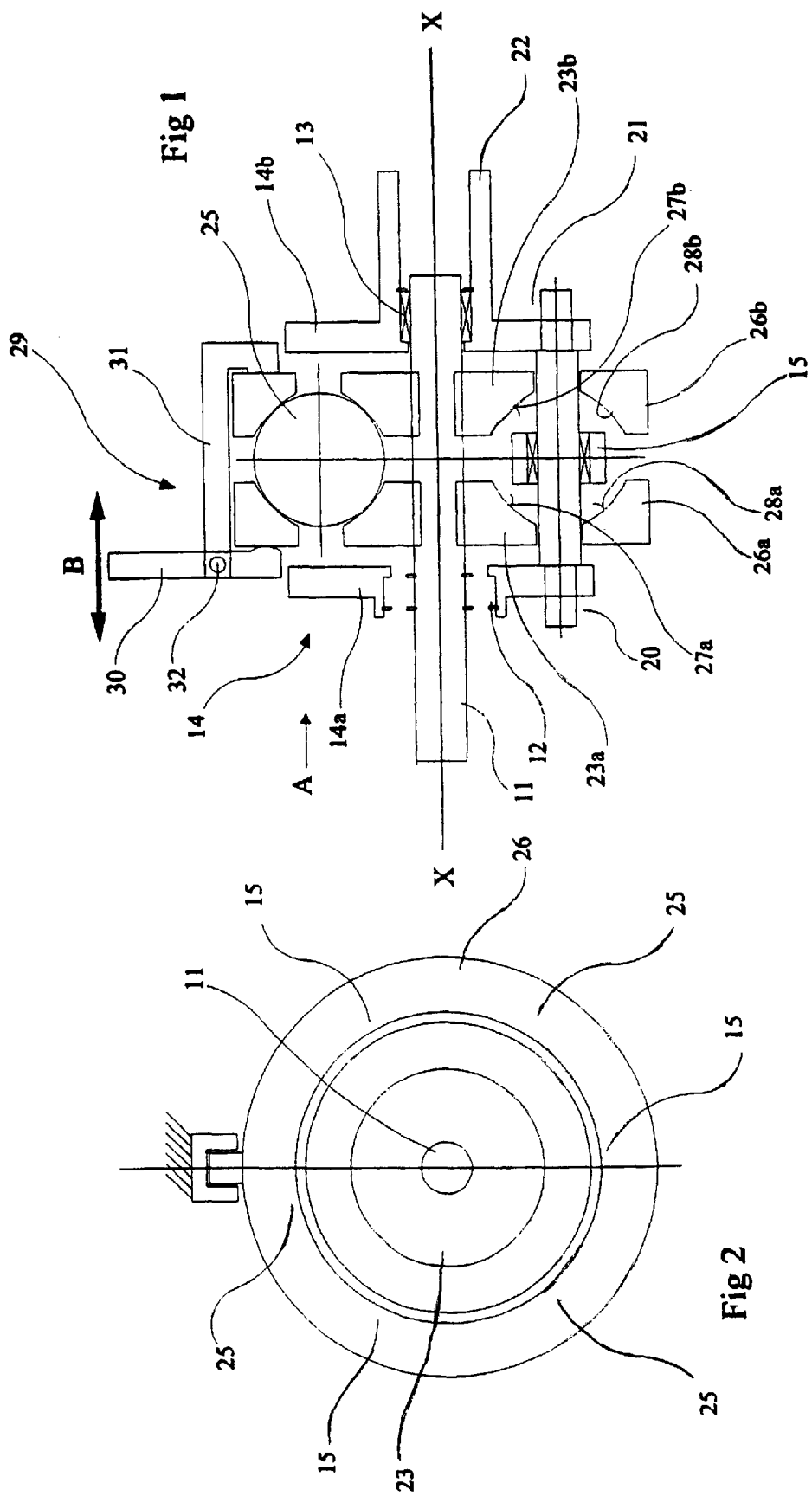

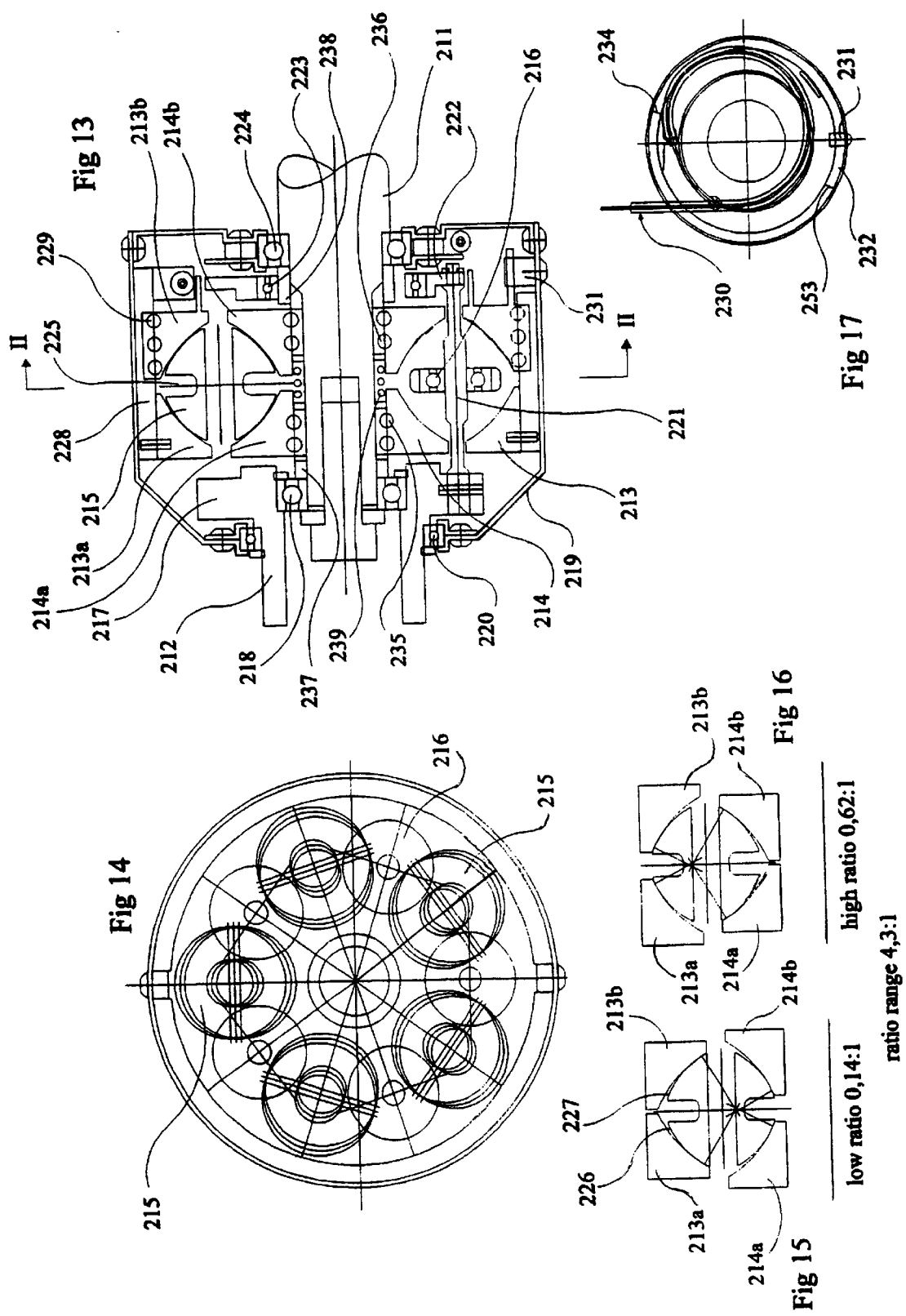

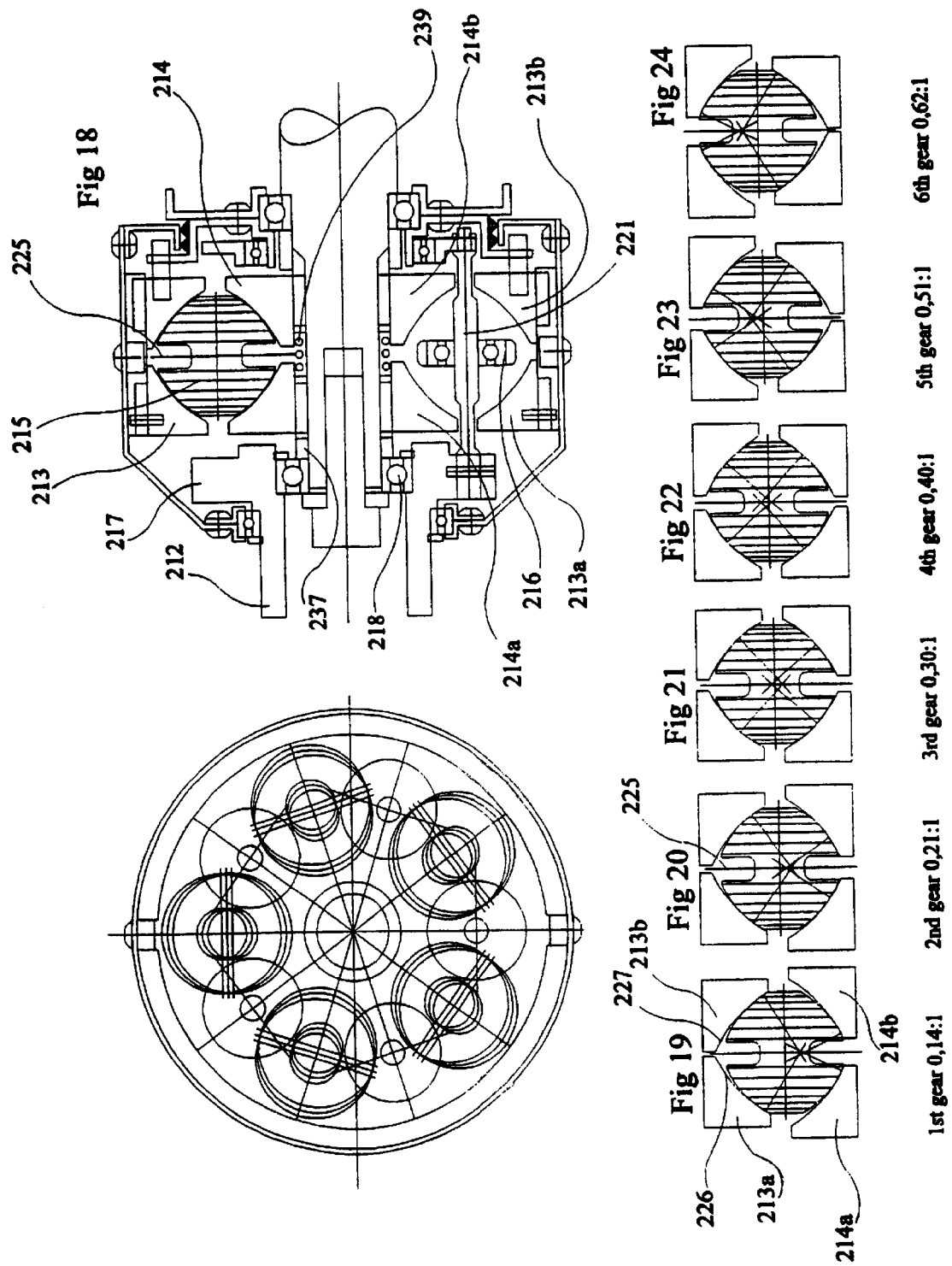

CONTINUOUSLY VARIABLE TRANSMISSION DEVICE

The present invention relates generally to a continuously variable transmission device, and particularly to such a device in which forces are transmitted by rolling traction.

One known type of continuously variable transmission, which has been put into commercial use in the drive train of a motor vehicle comprises a transmission belt of trapezoidal section passing around two split pulleys the opposite halves of which have facing inclined conical surfaces and are urged towards one another such that the effective transmission ratio between one pulley and the next is determined by the relative separation of the two parts of the pulleys. On being moved apart, the two parts of a pulley allow the belt to contact the conical faces at a radially inner position thereby changing the transmission ratio.

In this case the resilient forces exerted on the two parts of the other pulley cause them to move together to compensate for the reduction in tension in the belt thereby increasing the radius of the contact between the belt and the pulleys. Such transmission devices are, however, relatively large as they comprise two substantially spaced shafts, and moreover are not capable of rapid ratio change. They also tend to have low efficiency under part load operation. Versions having rubber belts can also be subject to large amounts of wear largely because of the sliding friction which takes place between the belt and the pulleys as the gear "ratios" are changed. It does have the advantage over conventional gear boxes of providing a continuous or stepless variation in drive transmission from a minimum to a maximum drive ratio. It is not, however, capable of providing a reverse ratio without further structural complications.

Other forms of continuously variable transmission are known, for example from U.S. Pat. No. 1,800,388. The present invention seeks to provide a continuously variable transmission in which the forces are transmitted between the members in motion by rolling contact. This minimises the amount of wear to which the members are subject upon changing the transmission ratio, and allows a continuously variable transmission to be made which is easy to control, requires low maintenance and offers a durable mechanism with a long service life.

According to one aspect of the present invention, therefore, there is provided a continuously variable transmission device of the type having planet members in rolling contact with radially inner and outer races each comprising two axially spaced parts, with control means for selectively varing the axial separation of the two parts of one race and thus the radial position of the planet members in rolling contact therewith, in which there are provided means sensitive to the torque applied to a drive-transmitting member of the transmission operable both to determine the compensating variation in the separation of the two parts of the other race and thus the transmission ratio of the device and to vary the forces exchanged between the planets and the races normal to the interface between them.

In a preferred embodiment of the invention the planet members are substantially spherical bodies. They may be right circular, oblate or prolate spheroids. Alternatively, the planet members may have respective first and second surface portions comprising surfaces of revolution about the same axis (for each member) the surface portions being inclined with respect to one another in opposite directions about the axes of revolution. The planet members may have a convex or concave surface of revolution defined by a curved generatrix which may be a regular or irregular curve or a part-circular curve. In the case of a part-circular generatrix this may be a semi-circle, in which case the surface of revolution of the planet member is spherical.

In such a structure the inner and outer races preferably comprises two parts, one in contact with each of the first and second portions respectively, and each having a respective surface constituted by a surface of revolution about a common axis and inclined in opposite directions with respect to the said axis. The two parts of one of the inner or outer races may be supported in such a way as to be relatively displaceable towards or away from one another whereby to vary the radius of the point or line of contact between the said one race and the planet members.

Embodiments of the invention may be provided with torque-sensitive mechanical coupling means interposed between an input drive member and one of the races whereby to balance the torque transmission and the contact pressures between the two parts of that race and the planet members.

In practice, it is preferred that the planet members are substantially spherical and captive between the radially inner races and the radially outer races, there being roller follower members circumferentially intercalated between adjacent pairs of planet members for transmitting drive to or from the said planet members. In such an arrangement it is particularly convenient if the roller follower members are carried on a planet carrier member to which drive to or from the planet members is transmitted in operation of the device.

In general terms, the present invention provides a drive transmission device as defined above, in which the axes of rotation of the planet members about their own axis are substantially parallel to the axis of rotation of the planets about the radially inner race. In such a drive transmission device it is a particular feature that the axis of rotation of the radially inner race is substantially parallel to the axis of the means defining the radially outer race defining the planetary path of the planet members.

In any event it is convenient if the means for selectively varying the axial separation of the two parts of the radially inner race or the means defining the radially outer race include two adjustment members interconnected by a helical interengagement such that relative turning motion of one of the adjustment members results in relative axial displacement of the other. In such a device the helical interengagement of the two adjustment members comprises a screw threaded engagement of the members themselves, the said one of the two adjustment members being turnable through at least a limited arc of movement about a first axis and the said other of the adjustment members being restrained against rotary motion at least about an axis substantially parallel to the said first axis. The helix angle may be constant over the entire length of the helix although for certain applications it may be found to be useful if the helix angle of the said helical interengagement varies over the circumferential extent of the helix.

In general, it is convenient if the said other of the two adjustment members is or is carried by or on the said means defining the radially outer track. The two parts of the radially inner race may be carried on a drive or driven shaft, and the means for allowing relative separation of the two parts of the radially inner race comprise at least one inclined surface acting to react the forces exerted by the transmission of drive forces between the radially inner race and the planet members. The said inclined surface may be part of a helical interengagement between the parts of the radially inner race and the drive shaft. The helix angle may be constant or may vary over the length of the helix.

Whether the helix is constant or varying its form and helix angle should preferably be such that the circumferential component of the axial force reacted by the helix is substantially equal to and opposite in sign from the direct circumferential force reacted by the helix such that the force required to be applied to the said selective adjustment means to maintain or change a transmission ratio is minimised.

The present invention also comprehends an infinitely variable transmission device comprising a continuously variable transmission as defined above together with a further epicyclic transmission train of fixed ratio gears or rolling traction members the dimensions of which are such that the effective radius of contact between the gears about the axes of the input shaft lies at a radius between the maximum and minimum radius of the line of contact between the radially inner race and the planets at opposite ends of the range of adjustment of the continuously variable transmission.

In such an embodiment when the radius of the line of contact between the planet members and the radially inner race of the continuously variable transmission is equal to the contact radius between the radially inner race and the planets of the epicyclic drive train of fixed ratio gears there is no effective transmission of torque and the torque transmission is delivered in one rotary direction or the other depending on whether the adjustment of the continuously variable transmission moves the line of contact between the planet members and the radially inner race to a point greater than or less than the radius of contact of the fixed ratio epicyclic gear train. This makes it possible to provide both forward and reverse transmission ratios.

In another aspect the present invention provides a rolling contact continuously variable transmission device of the type having planetary members in rolling contact with radially inner and outer races each comprising two relatively axially displaceable race parts, in which the planetary members are substantially spherical and the transmission forces to or from the spherical planetary members in planetary motion is effected via roller follower members.

In a practical embodiment the roller follower members are each interposed between respective pairs of adjacent planetary members and carried on a planet carrier member through which drive to or from the planet members is transmitted in operation of the device.

The rolling contact continuously variable transmission device of the invention may be considered, in one aspect, as a variable geometry four point contact rolling element bearing in which power transfer takes place between two or three principal bearing elements comprising a radially inner race, a radially outer race and a planet carrier or cage; a fourth bearing element being provided, usually fixed, for torque reaction.

In a transmission device formed as an embodiment of the invention the axial separation of the race which compensates for adjustment of the other is therefore determined in essence by the forces applied to the said other race elements. Such a continuously variable transmission may be combined with an epicyclic gear train to provide an infinitely variable transmission which has a transmission ratio varying from a negative value or nil to a maximum value determined by the dimensions of the device. It is also possible so to chose the relative shapes of the contacting surfaces of the races and the rolling elements that a so-called "geared" neutral position can be achieved in which no transmission of motion takes place despite the rotation of the drive member. Such a configuration also, therefore, allows the rolling elements to be in such neutral position at an intermediate point in their overall range of movement (which movement is determined by the controlled separation of that pair of the race members to which input control forces are applied) thereby allowing relative rotation of the input and output drive members in the same or in opposite directions depending on the adjustment of the transmission. This effectively results in the provision of forward and reverse drive ratios on either side of a neutral ratio.

Although such transmissions can be controlled in such a way that infinitely variable transmission ratio control can be effected, such control is unfamiliar to the majority of users in view of the almost universal use of stepped or incremental drive transmission ratios available from gearboxes used for effecting such ratio changes. Embodiments of the present invention can be made in which incremental control of the gear ratios is achieved by various means whereby to simulate a stepped gearbox. In one embodiment a control mechanism by which the separation of the two controlling raceways is determined has an incremental adjustment device or indexing mechanism allowing it to be displaced between several discrete predetermined positions. Alternatively, the contacting surface of some of the raceways may be shaped such that the forces exerted on the rolling elements tend to drive them to one of a limited number of predetermined positions.

Although a "geared" neutral has many advantages in a transmission device such as that defined herein inevitable tolerances may result in their being a certain amount of "creep" in either direction when the transmission device is set in its neutral position. To combat this it may be advantageous to provide means by which a "disconnected" neutral ratio may be achieved in which there is a positive break in the transmission chain allowing certainty in the selection of a neutral gear that no drive transmission will take place.

A disconnected neutral may be achieved in one aspect of the present invention by the addition of a relatively rotatable member or corresponding members, to either the radially inner or radially outer raceway contactable by the rolling elements over a certain part of the range of movement thereof in adjustment of the drive transmission. When the rolling elements are in contact with such relatively rotatable members the effective decoupling of the rolling elements from the raceways ensures that drive transmission does not take place in this adjustment.

A disconnected neutral may also be achieved by mounting one of the parts of the raceway in such a way that it can be withdrawn from its working position by a distance such as to release the pressure on the rolling elements at the time. This allows, in effect, a "declutching" action to be achieved with the transmission device set in any gear ratio.

A similar arrangement may be provided for a so-called "launch" control that is for progressive engagement of the transmission device from neutral to a drive gear ratio, and this can be achieved effectively by providing a range of motion of a ratio control member between the geared neutral position and a first detent or stop defining a lowermost gear ratio.

In some embodiments of the present invention described so far the drive transmission from an input shaft to an output shaft can only take place in one direction of rotation. This arises because the torque-sensing mechanism, which in one embodiment involves a helical interengagement between one of the two race parts in the said other race and a cooperating component allows the two race parts to be urged towards one another by the forces exerted on them in operation only when the direction of rotation of the input shaft corresponds to that of the helical interengagement.

Relative rotation between the input shaft and the output shaft in the opposite direction would result in a relative separation of the other race parts which would effectively result in a reduction in the contact forces and, ultimately, to a decoupling of the input and output members. This, of course, has certain advantages in some circumstances, particularly where an over-run free-wheel effect is desirable. However, for use as a motor vehicle transmission, especially one in which engine over-run is used for braking, the free-wheel effect is unwanted and, indeed, decidedly undesirable.

The present invention also seeks, therefore, to provide a continuously variable transmission device of the type described herein in which the transmission of torque from an input to an output shaft can take place in either direction of rotation.

According to another aspect of the present invention, therefore, there is provided a continuously variable transmission device of the type having planetary members in rolling contact with radially inner and outer races each comprising two axially spaced parts, with control means for selectively varying the axial separation of the two parts of one race and thus the radial position of the planetary members in rolling contact therewith, in which there are provided means sensitive to the torque applied to a drive-transmitting member of the transmission device, operable both to determine the compensating variation in the separation of the two parts of the other race and thus the transmission ratio of the device and to vary the forces exchanged between the planets and the races normal to the interface between them, and in which the said torque-sensitive means include the two axially spaced, relatively moveable parts of the said other race, each said part being itself axially movable in two directional senses from a central position and engagable by limit stop means whereby to allow the transmission of rotary drive from a rotary drive input member to a rotary drive output member of the transmission device in each of two opposite senses of rotation.

In a preferred embodiment of the invention the said relatively movable race parts of the torque-sensitive means are interconnected with the input drive member by a screw-thread engagement of the same hand by which rotary drive is transmitted when axial displacement of a race part is restrained.

The thread flights of the screw thread engagement are preferably interengaged by rolling elements such as balls although this is not essential. The provision of interengaging balls helps significantly to reduce frictional resistance in the device.

The said two relatively movable race parts of the torque-sensitive means may be oppositely axially resiliently biased. This resilient bias act to "prime" the torque-sensing reaction of the device and in a preferred embodiment of the invention the resilient biasing of the said two relatively movable race parts is achieved by a compression spring located between them.

Of course, in order to ensure that bi-directional rotation can take place each of the two race parts must ultimately be restrained from axial movement such that the other race part can, effectively "screw up" against it by the helical action exerted on it by the input member. Such limit stop means may comprise respective abutments on or carried by or associated with the said input drive member.

In one embodiment of the invention the two race parts of the said one race of the transmission device, the axial separation of which is selectively variable, are each carried on a casing of the transmission device in such a way as to have a limited rotational displacement in each of two opposite rotational senses. The relative axial separation of the two race parts of the said one race may be achieved by a helical interengagement of at least one of the two race parts with a fixed member of the transmission device, the two race parts both being relatively turnable with respect to the said fixed member. Such relative turning movement of the two race parts of the said one race may be achieved by any means which act directly between them rather than between one member and a fixed part. One means by which this can be achieved comprises a Bowden cable acting between the two race parts.

The present invention also comprehends, independently of the structure allowing bi-directional rotation to be achieved, a continuously variable transmission device of the type having planetary members in rolling contact with radially inner and outer races each comprising two axially spaced parts, with control means for selectively varying the axial separation of the two parts of one race and thus the radial position of the planetary members in rolling contact therewith, in which the planetary members each have a circumferential annular groove the axis of which substantially coincides with the respective rolling axis about which each planetary member turns as it rolls in contact with the races, the said annular grooves being engaged by roller follower members acting to guide the planetary members to maintain their orientation in their planetary motion.

This latter feature enables a greater load-carrying capacity to be achieved because a greater number of planetary members can be arranged in a given annular space because the circumferential space occupied by a planetary member can overlap that occupied by a planet follower.

The planet followers are preferably carried by a common carrier member through which drive transmission is conveyed to an output drive member of the device.

According to a further aspect of the present invention a continuously variable transmission device of the type having planetary members in rolling contact with radially inner and outer races each comprising two axially spaced parts, with control means for selectively varying the axial separation of the two parts of one race and thus the radial position of the planetary members in rolling contact therewith, has planetary members each with arcuately curved surface portions in rolling contact with correspondingly curved portions of the respective races, the radius of curvature of the said surface portions of the planetary members being greater than the effective radius of the planetary member itself.

This can be visualised by imagining the planetary members as spheres of a given diameter notionally split to remove a central portion and reassembled with the remaining quadrants in contact with one another. The radius of curvature of the surface portions will thus match that of the "original" sphere whilst the diameter of the newly-assembled sphere will be less than the diameter of the original sphere. Such planets may also be formed with circumferential grooves for receiving roller follower guide members as discussed above. There may further be provided means for guiding the planetary members to maintain the orientation of their rolling axes as they roll over the contacting surfaces of the races. Such guide members may be the above-mentioned rollers engaged in the circumferential grooves.

The purpose of enlarging the radius of curvature of the surface portions in relation to the diameter of the planetary member itself, is to extend the range of ratios which can be transmitted by the transmission device. In a specific embodiment, which will be described in more detail hereinbelow, the ratio range can be extended to 4.3:1.

In a further aspect of the present invention, which may be considered independently of the other aspects described hereinabove, there is provided a continuously variable transmission device of the type having planetary members in rolling contact with radially inner and outer races each comprising two axially spaced parts, with control means for selectively varying the axial separation of the two parts of one race and thus the radial position of the planetary members in rolling contact therewith, in which each planetary member has a plurality of elementary annular contact surface portions having a substantially constant inclination to the rolling axis of the planetary member itself.

This allows the continuously variable transmission to be provided with preferred adjustment positions effectively representing specific gear ratios of a conventional gear box. Increased load-bearing capacity is also achieved by providing what amounts to a line rather than a point contact between the planets and the races over the surface portions having substantially constant inclinations.

This can be viewed as a planetary member having a generatrix which includes a section comprising a plurality of substantially rectilinear elementary portions. The races may have substantially continuously curved contact surfaces or may have respective contact surfaces for rolling contact with the planetary members, each having correspondingly inclined elementary annular contact surface portions substantially matching those of the planetary members.

Various embodiments of the present invention will now be more particularly described, by way of example, with reference to the accompanying drawings, in which:

FIG. 1 is a schematic axial section of the major component of a rolling contact continuously variable transmission device useful for explaining the principle of operation of the device;

FIG. 2 is a schematic axial view of the transmission device seen from the direction of the arrow A of FIG. 1;

FIG. 13 is an axial sectional view through a first embodiment of the present invention;

FIG. 14 is a cross-sectional view taken on the line XIII—XIII of FIG. 13;

FIGS. 15 and 16 are schematic detail views showing components of the embodiment of FIGS. 13 and 14 in two different operating configurations;

FIG. 17 is a schematic cross-sectional view of the embodiment of FIG. 13 showing the relative positions of an adjustment mechanism;

FIG. 18 is an axial sectional view of an alternative embodiment of the invention; and FIGS. 19–24 are schematic views of a detail of the embodiment of FIG. 18 showing the components in different configurations for achieving different gear ratios.

Figure 4:
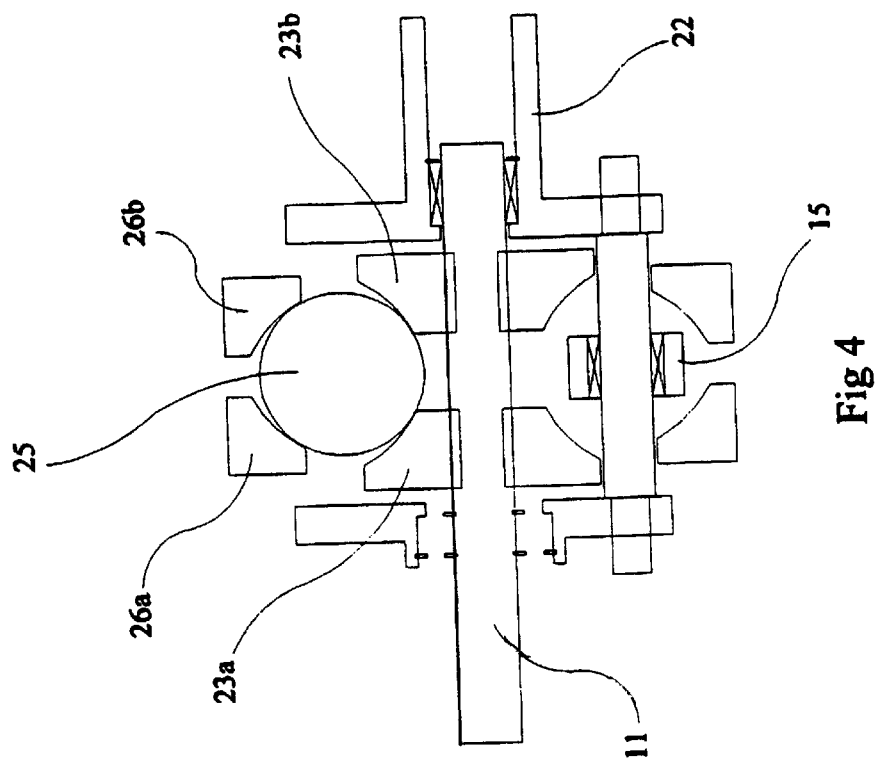
FIGS. 3 and 4 are schematic axial sections similar to FIG. 1 and respectively showing the transmission device in this configuration for the highest transmission ratio and that for the lowest transmission ratio.
Figure 3:
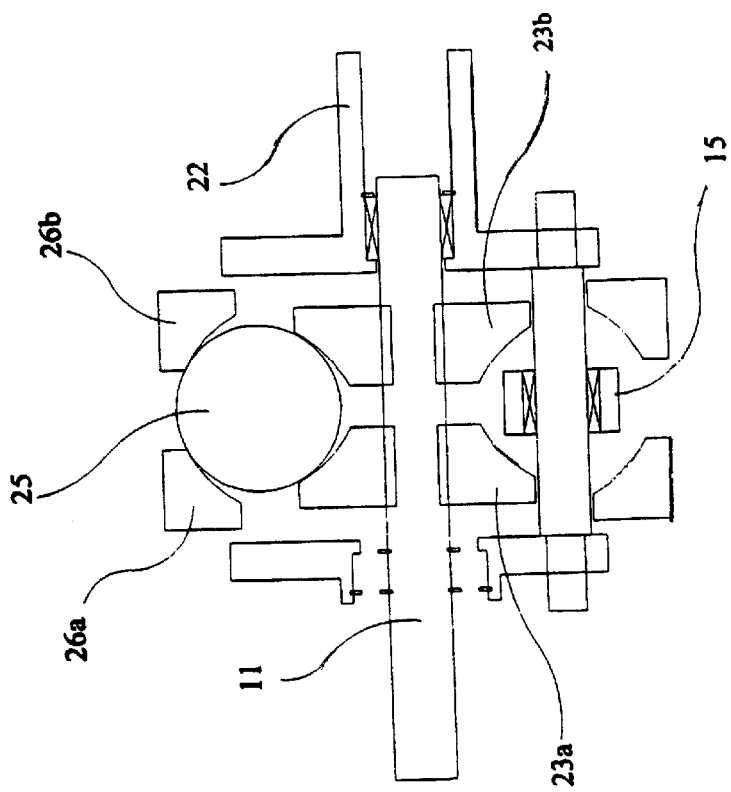

Referring first to FIGS. 1 to 4, the continuously variable transmission mechanism of the invention is formed as a variable radius epicyclic mechanism having rolling traction torque transfer with the advantage that the shaft bearings and housing are not subject to large forces and the moving parts can be based on traditional roller and ball bearing technology. It also has the advantages that it includes a purely mechanical preload and torque sensing system and that it can be splash or grease lubricated by a known traction fluid lubricant without requiring special lubricating techniques. As will be appreciated from the more detailed description which follows, the control of the transmission ratio can be effected by a simple mechanical device.

The variable radius epicyclical transmission device in FIGS. 1 to 4, sometimes referred to as a variator, comprises a housing (not shown for simplicity) within which is mounted an input shaft 11 bearing rolling element bearings 12, 13 within a planet cage 14 carrying three planet follower members 15. The planet follower members 15 are rotatably borne on the planet cage 14 by planet follower shafts 16.

The planet cage 14 is effectively constituted by two radial plates 14a, 14b joined together by shouldered studs 16 forming the said planet follower shafts and secured by nuts 20, 21 at each end to form a cage. An axial cylindrical extension 22 of the radial plate 14b of the planet carrier 14 constitutes the output shaft of the transmission mechanism.

On the input shaft 11 is carried a radially inner race 23 constituting a sun member comprising two parts 23a, 23b which are engaged to the shaft 11 by means of a coupling comprising a helical interengagement in the form of a screw threaded engagement. The two race parts 23a and 23b have oppositely handed threads so that, for reasons which will be descried in more detail below, a relative rotation of the input shaft 11 and the inner race parts 23a, 23b in one directional sense will cause the two parts to be displaced towards one another whereas axial separation of the two parts 23a, 23b of the inner raceway occurs where there is relative rotation between them and the input shaft 11 in the opposite directional sense.

Three spherical planetary members 25 are engaged between the inner raceway 23 and an outer raceway 26 also comprising two axially separated annular raceway members 26a, 26b. Rolling tracks of the raceway members 23a, 23b and 26a, 26b, respectively identified 27a, 27b and 28a, 28b each comprise, in cross-section, a part-circular arcuate surface the radius of which is slightly greater than the radius of the spherical planetary members 25.

The outer raceway members 26a, 26b are engaged by an axial adjustment mechanism generally indicated 29 and schematically shown in FIG. 1 as a lever 30 pivotally mounted on a reaction member 31 such that turning the lever in one direction or the other about a pivot 32 by which it is connected to the reaction member 31, and as shown by the double arrow B of FIG. 1, causes the two raceway parts 26a, 26b to be urged axially towards one another or allowed to separate axially from one another. The raceway 26 is provided with means for preventing its rotation about the axis X—X which is the common axis of rotation of the input shaft 11, the inner and outer raceways 23, 26, the output shaft 22 and the spherical planetary members 25.

In operation of the transmission rotation of the shaft 11 is transmitted to the inner raceway 23 rotation of which causes rotation of the balls 25 by rolling contact therewith, the balls 25 rolling over the stationary raceway 26. Rotation of the balls 25 is transmitted via the roller followers 15 to the roller cage 14 and thus to the output shaft 22. By displacing the lever 30 in one direction or the other the two parts 26a, 26b of the outer raceway can be urged towards one another or allowed to move axially away from one another. Axial approach of the two outer raceway members 26a, 26b applies pressure to the planetary balls 25 causing them to move radially inwardly of the transmission device urging the two inner raceway parts 23a, 23b apart. The helical interengagement between the radially inner raceway parts 23a, 23b and the input shaft 11 acts in effect as a torque-sensitive mechanism in that the helical interengagement is such that rotation of the shaft 11 in the intended direction of drive causes the raceway parts 23a, 23b to approach one another axially when resisted by drag so that any play in the rolling contact between the raceways and the planetary balls 25 is taken up and compensated by the tendency of the raceway parts 23a, 23b to approach one another until the forces exerted on the helical interengagement between the raceway parts 23a, 23b and the drive shaft 11 matches the reaction forces between the raceway parts 23a, 23b and the planetary balls 25, at which point no further relative axial displacement of the raceway parts 23a, 23b takes place and drive transmission takes place at a transmission ratio determined by the radial position of the balls 25 when this occurs.

In the configuration illustrated in FIG. 4 it will be seen that the radius of rolling contact between the balls 25 and the inner raceway 23 is relatively large and the radius of contact between the balls 25 and the outer raceway 26 is relatively small. In this configuration the transmission ratio between the input shaft 11 and output shaft 22 is at its lowest. By allowing the lever 30 to move in the opposite direction, however, the raceway parts 26a, 26b are allowed to move apart so that the balls 25 can move radially outwardly compensated by axial approach of the inner raceway parts 23a, 23b.

The difference between the curvature of the curved surfaces 26a, 26b, 27a, 27b of the raceways 23, 26 and the spherical planet members 25 will determine the precise shape of the contact patch which in practice exists between the members in rolling contact. Although in an idealised situation the contact would be a point contact, in practice, because the interior of such a variable transmission would contain a lubricant in the form of a special traction fluid which both lubricates the moving parts and enhances the rolling traction between them, the points of contact will constitute contact patches which are larger the closer the radii of the contacting surfaces are to one another. It is, of course, undesirable that these patches should be too large in order to avoid the so-called spin loss resulting from forces developing in the hydrodynamic fluid between the two elements in rolling contact.

The continuously variable transmission mechanism described above is extremely compact and highly efficient, and has no need for a pressurised hydraulic circuit for either lubrication or control purposes in order to achieve the required function. It can be in modular form and is scalable readily to accommodate both large and small size applications.

It is appreciated that, of course, if the input shaft 11 were considered as a unitary member there would be no way in which the two parts 23a, 23b of the inner race could be fitted over the unthreaded ends of the shaft 11. This, however, could be achieved by forming the input shaft 11 as composite member with the unthreaded parts assembled to the threaded parts after the sun members 23a, 23b has been fitted thereto. Alternatively, however, the shaft 11 may simply be of smaller diameter, at the end portions which are not threaded, to match the radially innermost dimension of the thread flights allowing the sun parts 23a, 23b to be slid along them upon assembly.

Although as illustrated schematically in FIG. 1 the separation of the two race parts 26a, 26b is controlled by a simple lever 30 with a suitable counteracting member 31 applying symmetrical forces to the two race parts 26a, 26b to cause them to move together or apart as determined by the movement of the lever 30 it will be appreciated that in a practical embodiment it is necessary to apply the axial forces to the raceway parts over the entirety of the circumference or at least at several symmetrically located positions.

Figure 5:
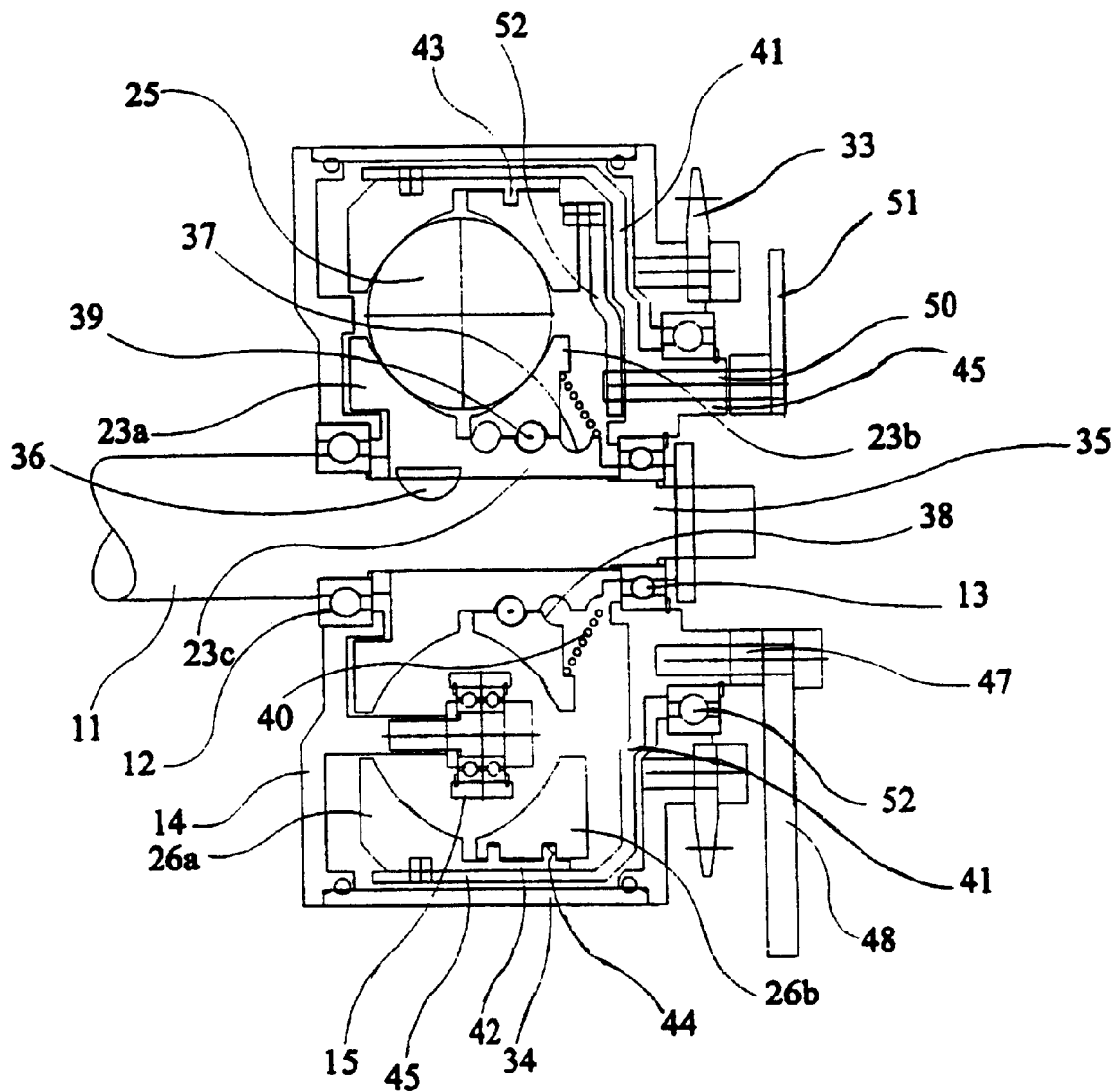
FIG. 5 is an axial sectional view of a continuously variable rolling contact transmission device formed as a first embodiment of the present invention.

Turning now to FIG. 5 there is shown a practical embodiment in which this adjustment is achieved in a way which applies the adjustment forces symmetrically around the entire periphery of the radially outer raceways. The structure of this embodiment is based on the realisation that the forces exerted by the spherical planets 25 do not need to be transferred through two planet carrier plates such as 14a, 14b of FIG. 1 but that they are sufficiently balanced to allow only a single planet carrier plate to be utilised providing that the input shaft 11 is provided with suitable bearings in order to prevent axial misalignment.

In this embodiment the same reference numerals are used to identify the same or similar components as in the embodiment of FIGS. 1 to 4. The input or drive shaft 11 carries the variable transmission unit in its entirety. Such an embodiment is suitable, for example, as the gear transmission from a moped or motor cylce to drive a wheel via a chain drive. For this purpose the output drive member from the variable transmission is a chain wheel 33 carried on an external casing 34 secured to the periphery of the planet carrier 14 which, in this embodiment, comprises a single disc having shafts 16 projecting therefrom. Unlike the embodiment of FIGS. 1 to 4, however, the shafts 16 do not pass right through the space between the inner and outer races 23, 26.

The drive shaft 11 may, for example, be the output shaft from an internal combustion engine or other prime mover. It has a projecting end portion 25 of smaller diameter than the main part of the shaft 11 carrying one of the two parts (in this case the part 23a) of the inner raceway 23 secured for rotation with the shaft 11 by a woodruff key 36. In this embodiment, instead of the two radially inner raceway parts 23a, 23b both being relatively movable with respect to the shaft 11 in their approach and separation movements, the raceway parts 23a is fixed for rotation with the shaft 11 and has an axially extending sleeve 23c over which the second raceway part 23b is fitted. The outer cylindrical surface of the sleeve 23c and the inner cylindrical surface of the second radially inner raceway part 23b are provided with matching helical channels 37, 38 of semicircular cross-section housing a plurality of balls 39. Relative axial separation or approach of the two raceway parts 23a, 23b can be achieved, therefore, by relative rotation of these two parts about the axis of the drive shaft 11. A light spring 40 engaged between the second of the radially inner raceway parts 23b and a stationary housing 41 provides a light pre-loading of the second radially inner raceway part 23b to ensure that this always maintains contact with the spherical planets 25 even in no load conditions so that the radially inner raceway parts 23a, 23b do not become axially separated by such a distance that the spherical planets 25 become loose and rattle within the track defined by the radially inner and outer races 23, 26.

The radially outer race 26 comprises a first part 26a which has an axially extending sleeve 42 within which the second of the radially outer raceway parts 26b is fitted. The inner surface of the cylindrical sleeve 42 has a helical ridge 43 of rectangular cross-section and the second radially outer raceway part 26b has on its outer cylindrical surface a helical channel 44 of corresponding rectangular cross-section. The ridge 43 and channel 44 form a robust scroll similar in configuration to an "ajax" screw thread.

The first radially outer raceway part 26a is rotatably fixed but axially free on a cylindrical outer wall 45 of the fixed housing 41 which carries a projecting lug 47 on which is supported a torque-reaction arm 48 which engages a fixed part of the framework of the vehicle to maintain the housing 41 stationary (that is non-rotating) with respect to the vehicle.

The housing 41 also carries a second projecting lug 45 which, in this case, is hollow and receives a shaft 50 one end of which projects out from the casing 41 and carries a control lever 51 and the other end of which projects into the casing and carries a lever 52 the free end of which is secured to the second radially outer raceway part 26b. Movement of the control lever 51 about the axis of the pivot pin SO causes the lever 52 to turn correspondingly and thus cause the raceway part 26b to turn about the axis of the device, which is coincident with the axis of the input drive shaft 11, with respect to the fixed radially outer raceway part 26a. This movement is converted by the helical interengagement constituted by the helical channels 44 and helical rib 43 into axial approach or separation of the two radially outer raceway parts 26a, 26b.

Rotation of the drive shaft 11 thus causes the radially inner race 23 to rotate and carry with it, by rolling contact, the planetary spheres 25 which roll also over the curved surfaces of the radially outer race 26. As in the generalised embodiment of FIG. 1, the planetary spheres 25 are constrained only by their contact with the curved surfaces 27a, 27b and 28a, 28b of the radially inner and radially outer races 23, 26 respectively but each pair of planetary spheres 25 has a roller follower intercalated circumferentially therebetween so that the planetary motion of the spheres 25 is conveyed to these rollers and, via the shafts 16, to the planet carrier 14 which, in this case, constitutes the entire outer casing of the unit carrying the output sprocket 33 which may, for example, carry a chain for onward transmission of drive to the wheel this embodiment includes a further bearing 52 between the rotating outer casing 34 and the fixed inner housing 41. Variation in the relative approach or separation of the radially outer raceway parts 26a, 26b, caused by turning the control lever 51 in one direction or the other, causes a greater or lesser force to be applied to the planetary balls 25 urging them radially inwardly into contact with the radially inner raceway 23. As the two radially outer parts 26a, 26b are brought together the forces exerted on the planetary balls 25 increases and the radially inner force applied to the radially inner races 23a, 23b urging these apart is accommodated by relative rotation of the raceway part 23b with respect to the raceway part 23a with the balls 39 in the channels 37, 38 acting in effect as a torque-sensitive mechanism which allows compensating rotary movement of the movable inner raceway part 23b with respect to the "fixed" raceway part 23a, fixed, that is, with reference to the drive shaft 11 against axial movement. The raceway part 23a, rotates at the same speed and with the drive shaft 11 as does the raceway part 23b apart from a minor variation when relative movement over a limited arc takes place for compensating adjustment of the pressures applied by the planetary spheres 25. High and low ratio transmission, with a continuous variation between the end points, can be achieved by movement of the lever 51 as described in relation to FIGS. 3 and 4.

The function of the inner race thread 37, 38, 39 is to maintain the ratio of normal to tangential (tractive) force (n/f) of each planet ball contact point within a certain range. The ratio must be large enough to ensure that excessive slip does not occur (at least 10 for partial lubrication and up to twice that for full hydrodynamic lubrication) but not so large that a significantly greater normal force is applied than is needed, which would reduce efficiency, torque capacity and life of the unit. It may be mentioned here that a spherical planet shape is unique in behaving perfectly in this role for, when such a planet is in equilibrium under the action of four peripheral contact radial 'squeezing' forces in the plane of the drawing (the n direction) and a driving force through its centre normal to the plane of the drawing (the f direction), as here, n/f has the same value wherever on the periphery the contact points may be. This means that the inner and outer race n/f values are equal for any ratio setting of the transmission.

A light torsion spring 40 acting between the two inner race halves provides sufficient preload to ensure that there is always enough contact pressure for the torque sensing mechanism to start working when torque increases from zero.

Figure 7:
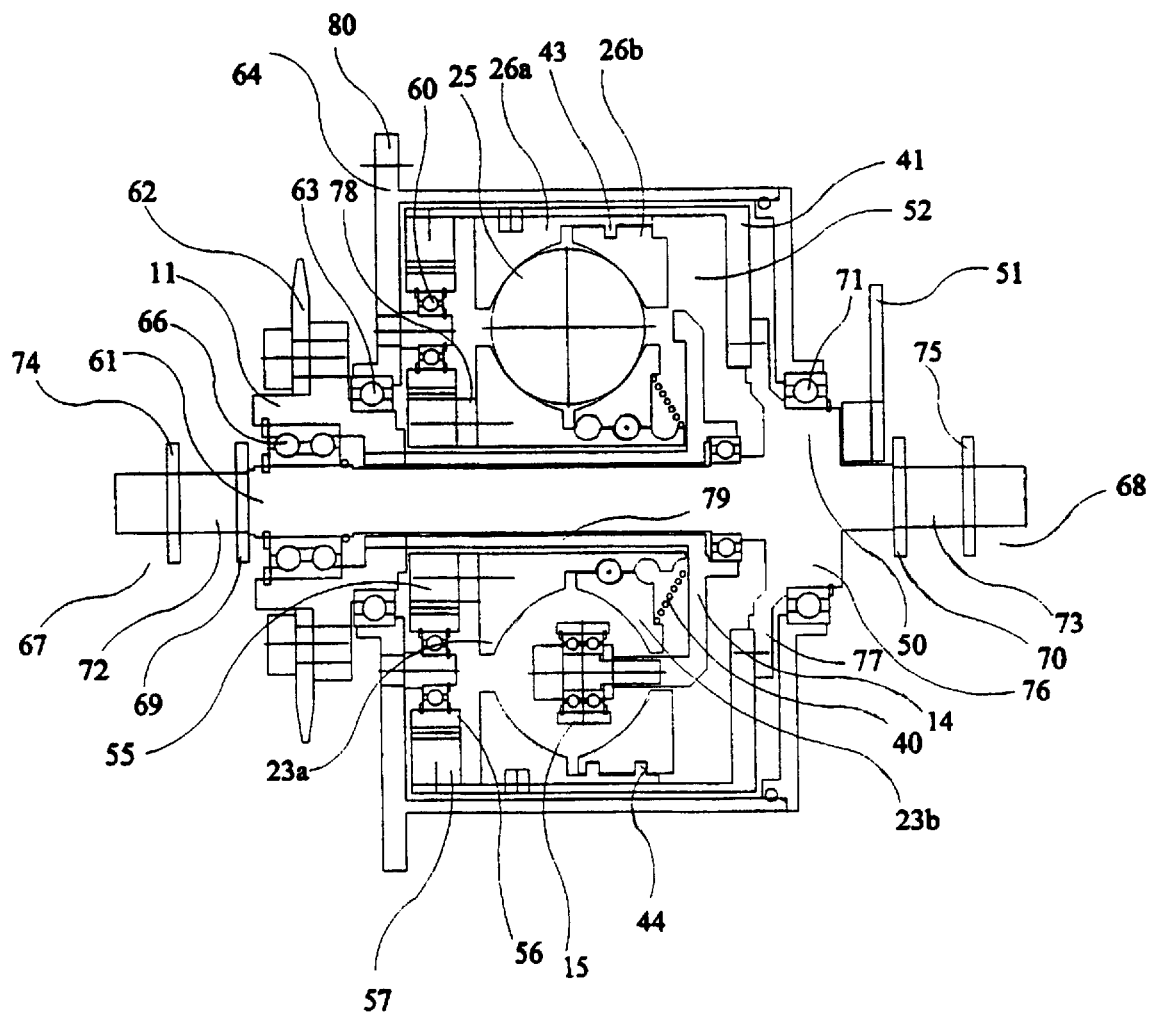
FIG. 7 is an axial sectional view of a further embodiment of the invention suitable for use as a bicycle hub gear transmission.

The outer race thread 43, 44 must have a pitch coarse enough to effect ratio changing between extremes without requiring excessive travel of the ratio change lever 51, while not being so coarse that the contact conditions simply force the races apart. The type of transmission shown in FIG. 7 is particularly suited to applications having high torque, low speed inputs, such as occur in a bicycle. This is because, with input at the planet carrier, input torque is reacted at a larger radius and by twice as many contact patches as when input is at the inner race. In some case, such as the bicycle, output gearing is required to reduce output speed to that required for the application.

Figure 6:
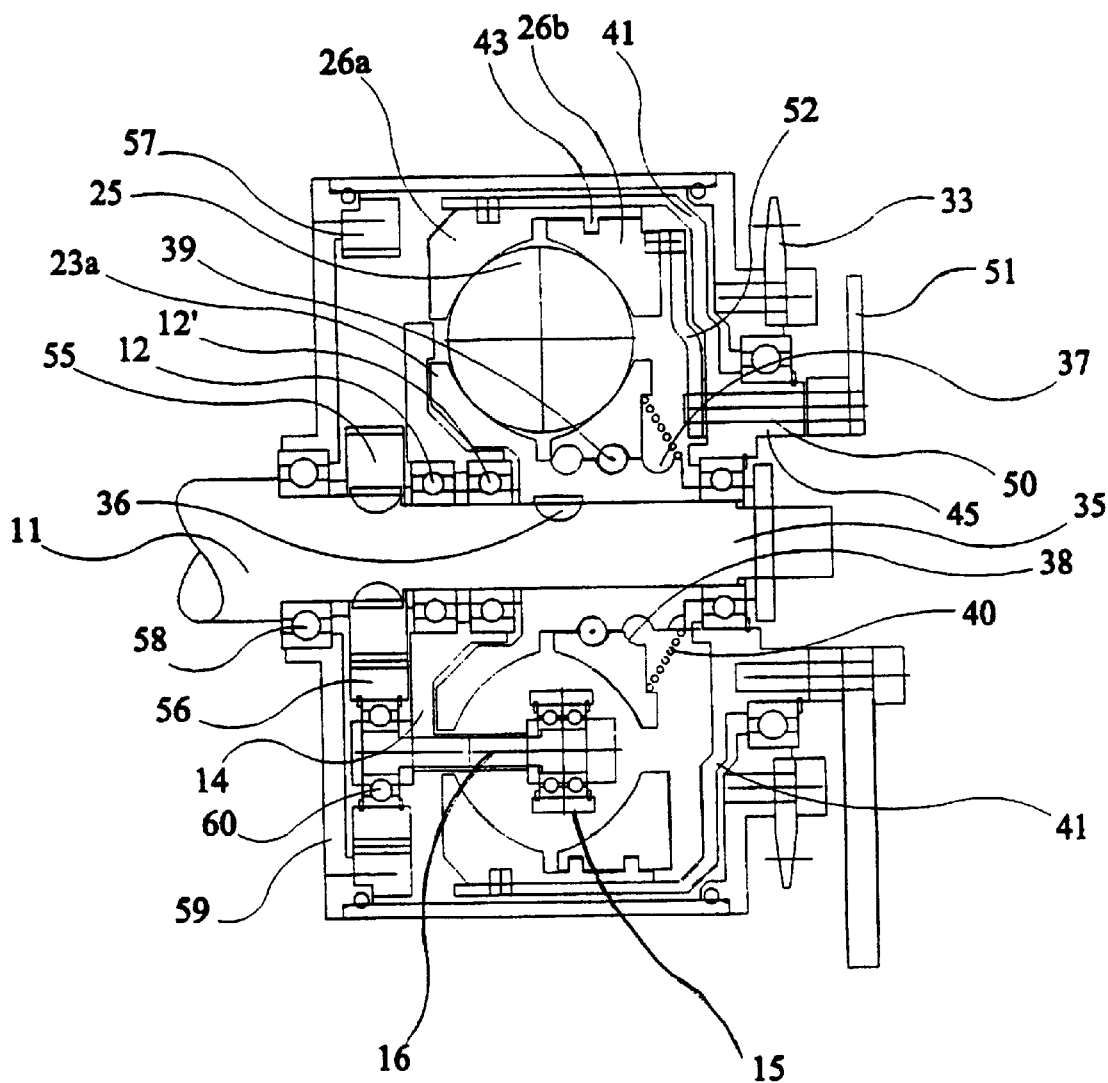
FIG. 6 is a schematic axial sectional view showing a rolling contact continuously variable transmission device incorporated in an infinitely variable transmission device.

The embodiment of FIG. 6 comprises an infinitely variable transmission having both forward and reverse transmission ratios. It comprises a continuously variable transmission mechanism similar to that described in relation to FIG. 5 the input side of which is provided with an epicyclic gear train of fixed ratio gears. Again, those components which are the same as or fulfil the same function as corresponding components in the embodiment of FIG. 6 will be identified with the same reference numerals.

The mechanism for varying the transmission ratio between the input drive shaft 11 and output sprocket 33 is substantially the same as that described in relation to FIG. 5 and, therefore, only the differences between the embodiment of FIG. 6 and the embodiment of FIG. 7 will be described in detail. The input shaft 11 has an additional fixed ratio sun wheel gear 55 which meshes with a set of planet gears 56 equal in number to the planet follower rollers 15 and carried respectively on the same shafts as 16.

The planetary gears 56 mesh with an outer ring gear 57 fixed to an outer casing 59 which carries the output sprocket 33. In this embodiment, because the planetary gears 56 are constantly in mesh with the sun wheel 55, rotation of the shaft 11 will cause the planet follower rollers 15 to rotate at a given speed when the ring gear 57 and consequently the outer casing 59 (and therefore the output drive sprocket 33) is stationary. The stationary or "neutral" drive condition, therefore, occurs when the radial position of the planetary spheres 25 is such that the speed of rotation is the same as that of the roller followers. This provides a "geared" neutral position. Adjustment of the lever 51 to cause the planetary spheres 25 to adopt a radially inner position with respect to the "neutral" position just described will cause the balls to apply a force to the roller followers 15 such as to slow their speed of rotation with respect to that at which they would rotate with the ring gear 57 stationary, thus causing transmission of drive torque to the ring gear 57 in a first direction. This transmission of drive torque may be considered as a "reverse" direction and the speed thereof increases with a decrease in the radial position of the planetary spheres 25.

By contrast, if the adjustment of the lever 51 is such as to allow an increase in the radial position of the planetary spheres 25 this will increase the speed of the spheres causing them to apply a force to the roller followers which will cause the planetary gears 56 meshing therewith to transmit a force in the "forward" direction to the ring gear 57 which is transmitted via the casing 59 to the drive sprocket 33. Again, further adjustment of the lever 51 causing a further increase in the radial distance of the planetary spheres 25 from the axis of the input shaft 11 will increase the gear ratio and consequently the speed of the sprocket 33 for a given input speed of the drive shaft 11.

The embodiment of FIG. 7 is somewhat similar, but instead of having an epicyclic fixed gear train at the input to the continuously variable transmission device it has such a gear train at the output from the continuously variable transmission device. Moreover, the embodiment of FIG. 7 is adapted particularly for use as a bicycle gear hub transmission device for which purpose the central shaft is not a drive shaft, but a stationary spindle about which the entirety of the device rotates. Again, those components which are the same as or fulfil the same functions as corresponding components in the embodiments of FIGS. 5 and 6 will be identified with the same reference numerals.

In this embodiment the central shaft 61 is a stationary fixed shaft which has threaded end portions 72, 73 engaged by respective nuts 67, 68 which can be screwed on to the threaded end portions 72, 73 to engage a frame portion of the bicycle between respective pairs of washers 69, 74 and 75.

The shaft 61 has an axial enlargement 76 adjacent its right hand end from which extends a radial flange 77 carrying the fixed casing 41 which at its left hand end carries the outer ring 57 of an epicyclic fixed ratio gear train having a plurality of planetary gears 56 meshing the with ring gear 57 and a sun gear 55 which is carried by axial mounts 78 on the radially inner raceway part 23a.

The planet carrier 14 of the continuously variable transmission has a cylindrical inner sleeve 79 which at its left hand end carries a shaped tubular input member 11 which carries a drive sprocket 62 and is itself borne by bearings 66 on the stationary shaft 61 and carries an outer casing 64 via bearings 63, 71. The outer casing 64 is the "hub" portion of a bicycle wheel having a radial flange 80 from which the bicycle wheel spokes may project radially.

In operation, rotation of the input sprocket 62, for example by means of a chain drive conventional for bicycles, causes rotation of the planet carrier 14 and thus the planetary spheres 25 urged by the roller followers 15 carried by the planet carrier 14. The stationary, radially outer race 26a, 26b carried on the stationary housing 41 fulfils the same function as before, and has an adjustment scroll defined by ribs and channels 43, 44 as in the embodiment of FIGS. 5 and 6, and likewise a lever 52 for controlling the circumferential position of the outer raceway part 26b and thus its axial position relative to the other outer raceway part 26a.

The rotation of the planetary spheres 25 is transmitted to the radially inner races 23a, 23b which, carrying the sun gear 55 of the fixed ratio epicyclic gear mechanism causes the planet gears 56 to rotate which, because they mesh with the stationary ring gear 57, causes the outer housing 64 to turn with a drive transmission ratio and direction of drive dependent on the adjustment of the radial position of the planetary spheres 25.

The freewheel function normally provided in a cycle transmission may be included within the function of the variator. So long as the preload between the inner race halves is small, that is spring 40 is weak, in the absence of input torque, as when freewheeling, the planet balls are in only light contact with the races and the amount of drag torque thereby generated is negligible.

In many applications input gearing may be used to increase variator power capacity. Since the power capacity of a variator is normally limited by its torque capacity, while its speed capability is normally much greater than required, input gearing may be used to reduce the former and increase the latter. For example, an electric motor prime mover with an output speed of 3000 rpm could be advantageously combined with variator input gearing of ratio 3:1, thereby generating a still tolerable 9000 rpm variator input speed but tripling the power capacity of the variator. In many applications, such additional input gearing would permit the use of a smaller variator unit.

Figure 8:
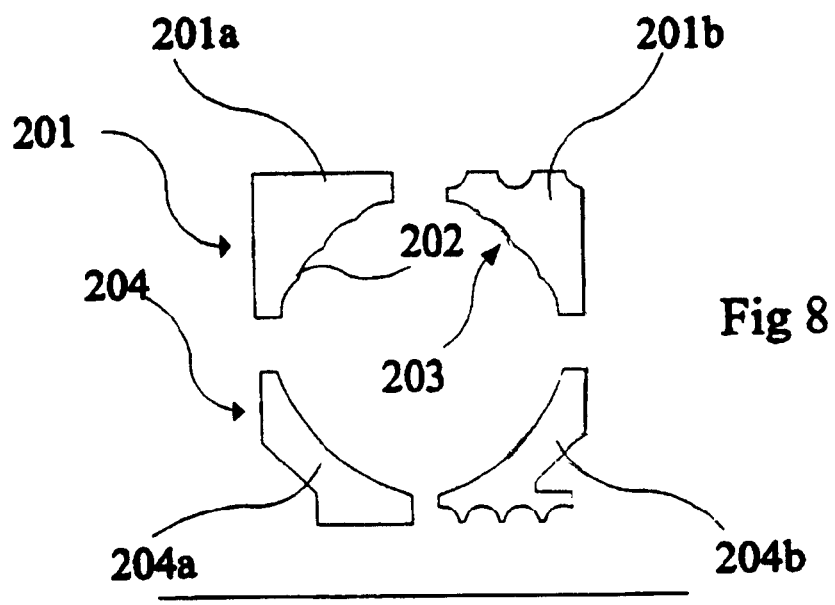
FIGS. 8, 9 and 10 are schematic partial axial sectional views of various different raceway configurations useful for various specific applications.
Figure 9:
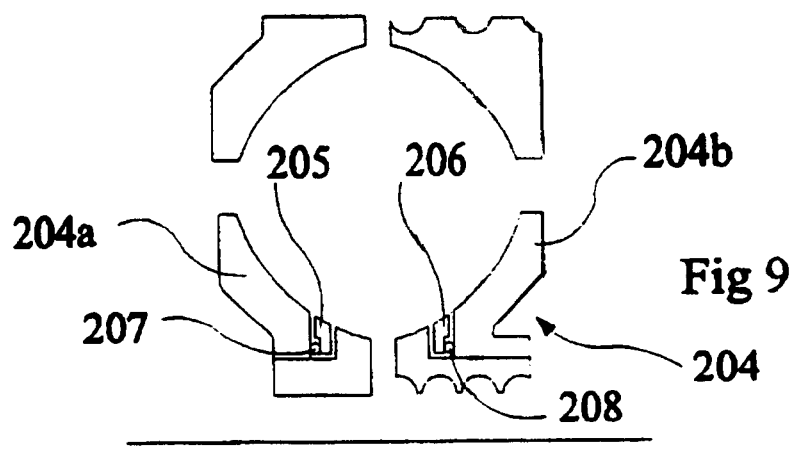
Figure 10:
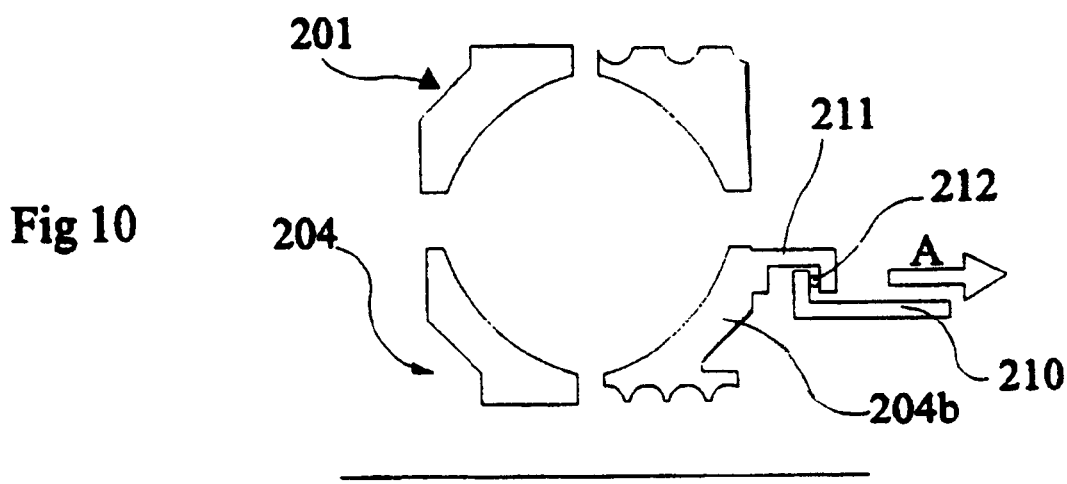

Referring now to FIGS. 8 to 10 there are shown various alternative configurations for the radially inner and outer races 23, 26. In the description of these drawings it will be understood that the part of the drive mechanism illustrated is only that part relating to the immediate contact of one rolling element with the radially inner race and the radially outer race. The planetary spheres (which are not shown in the drawings) are substantially identical to those in the embodiments of 5 to 7.

In the embodiment illustrated in FIG. 8, the radially outer race 201 has a curved inner or contact surface 202 having four local annular features in the form of sectors of shorter radius of curvature than the overall radius of curvature of the raceway. These annular indentations are identified with the reference numeral 203 in FIG. 8. It will readily be appreciated that a ball trapped between the outer raceway 201 and inner raceway 204, each of which is split into two parts 201a, 201b and 204a and 204b will settle in contact with one of the four local annular features 203 for preference as a result of the relative inclination of the normal to the points of contact between the raceways 201a, 201b and the planetary ball itself unless this is centred on one of the local annular features 203. This effectively provides for incremental adjustments which the system will automatically favour so that although the adjustment is infinitely variable it can simulate an incremental adjustment pattern of a conventional gear box. This also has the beneficial effect that the stability of the drive transmission in a selected ratio is increased and it lowers the contact stresses. It will of course be appreciated that the annular features 203 illustrated in the drawing are greatly exaggerated for clarity and that in reality the radius of curvature of each of the annular track parts 203 would have a curvature somewhere between that of the planet ball and that of the race.

FIG. 9 illustrates an embodiment in which a "disconnected" neutral position is made available. In this embodiment the radially inner raceway 204 is provided with two free rotation rings 205, 206 one mounted in the ring half 204a and the other in the ring half 204b. Each of these rings 205, 206 is mounted via, in this case, a ring of balls 207, 208 respectively such that when the relative separation of the two inner race parts 204a, 204b is such that the contact between the planet balls (not shown) and the inner races 204a, 204b coincide with the rings 205, 206 the transmission of drive is interrupted by the rolling contact of the balls 207, 208.

Turning now to FIG. 10, the alternative embodiment shown comprises a similar pair of raceways 201, 204 as in the previous two embodiments, but in this case one half 204b of the inner raceway 204 is axially displaceable in the direction of the arrow A of FIG. 10 by axial displacement of a control member 210 engaged with an arm 211 of the inner raceway half 204b via a bearing 212. Thus, whatever gear ratio is operative at the time, the drive mechanism can be placed in a "neutral" gear by displacement of the raceway part 204b.

In any of the embodiments described hereinabove a separate "launch" device may also be provided to control an initial range of movement of the controlling races from a "neutral" position to a low "gear" ratio. Such mechanism may provide for a fixed relative displacement of the control races so that the "launch" control mechanism can be utilised effectively as a "down shift" whilst the mechanism is in a drive transmission gear. This will have the effect of lowering the gear ratio by a predetermined amount corresponding to the variation from neutral to the low gear when used in its "launch" mode.

Figure 11:
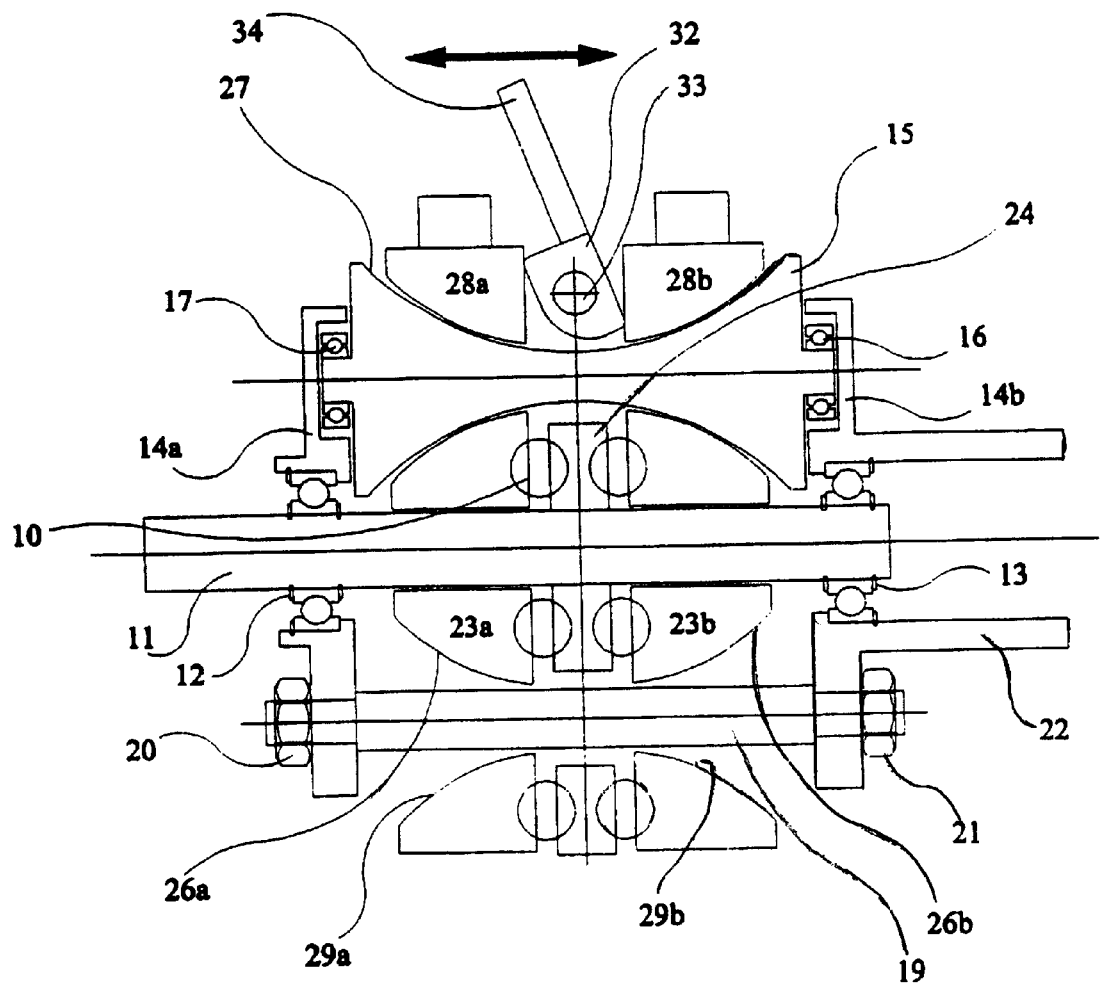
FIGS. 11 and 12 are schematic axial sectional views of alternative embodiments having different planetary members.
Figure 12:
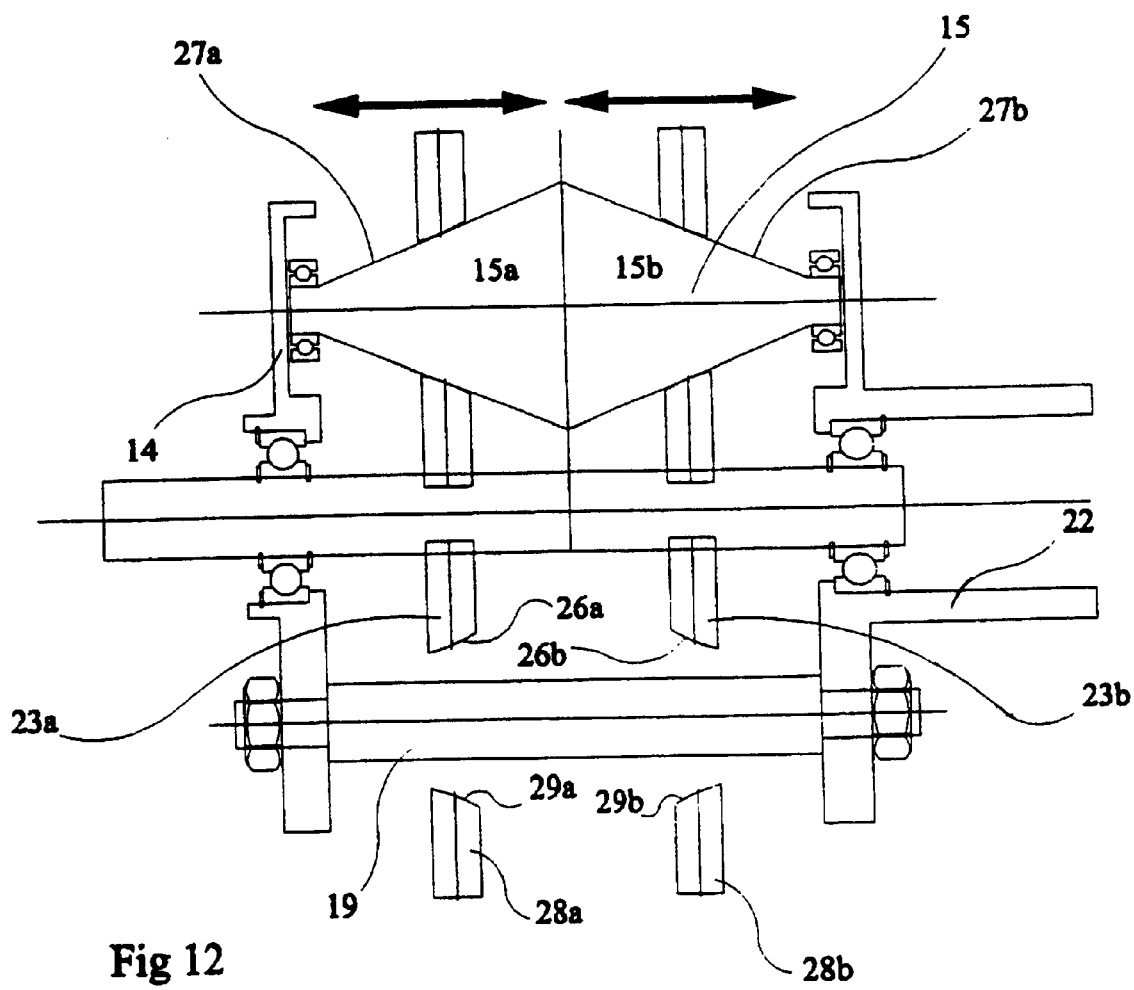

Turning now to the embodiments of FIGS. 11 and 12 these illustrate continuously variable drive transmission devices which operate on the same general principles as those embodiments described above, but in which the form of the planets is substantially different, with consequent variation in other components. Nevertheless, those components which are the same as, or fulfil the same functions as, corresponding components in previously-described embodiments, will be identified with the same reference numerals. In the embodiment of FIG. 11 the sun members 23a, 23b together define a radially outer barrel shape surface, with the sun member 23a having a curved surface 26a comprising a surface of revolution generated by an arcuate generatrix inclined in a first direction with respect to the axis of the input shaft 11 (namely converging towards this axis to the left) whilst the sun member 23b has an external surface of revolution 26b constituted by a surface of revolution generated by a generatrix in the form of an arcuate line diverging from the axis of the shaft 11 towards the left. The curved radially outer surfaces 26a 26b of the sun member are in rolling contact with the curved surface 27 of each planet 15 which, in this embodiment, has what may be described as a "diabolo" shape representing the surface of revolution of a curved line which is convex towards the axis of revolution.

Extending circumferentially around the path followed by the planets 15 and in rolling contact therewith, is a track member 28 constituted by two separate track parts 28a, 28b each having radially inner curved surfaces 29a, 29b respectively which constitute surfaces of revolution of arcs which are (but do not have to be) the mirror image of the arcs constituting the generatrices of the respective axially coincident sun part 23a or 23b. Moreover, the radius of curvature of the arcs defining the curved surfaces 26a, 29a are slightly smaller than the radius of curvature of the curved arcs 27 defining the curved surface of the planet 15.

The track member 28 has a dog tooth engaged by a fixed member 31 ensuring that the track 28 remains stationary with respect to the casing (not shown). This dog tooth is illustrated purely schematically in FIG. 11 it being understood, in practice, the means by which the track 28 is held stationary within the casing (not shown) may be of different form.

Between the two track members 28a, 28b is a cam 32 pivotally mounted about a point 33 and controlled by a lever 34. Again, only one lever 34 is shown in FIG. 11 although, in practice, a mechanism providing forces acting symmetrically around the circumference of the track 28 will be required.

Turning now to the embodiment of FIG. 12, this has substantially the same principle of operation, but differs from the embodiment of FIG. 11 in that the planets 15 are formed as two cones 15a, 15b joined at their larger base (although in practice formed as a single unitary body) which avoids the need for double-curved surfaces as in the embodiment of FIG. 11. This constitutes a certain simplification since the conical surfaces 27a, 27b of the two cones 15a, 15b can be formed as generatrices of straight lines. The planets 15 are carried by roller bearings 16, 17 housed in radially elongate slots 18 in the planet carrier 14.

The sun members 23a, 23b can then be formed as two disks having inclined surfaces 26a, 26b although, in order to retain relatively small contact patches these surfaces will nevertheless be curved surfaces formed as surfaces of revolution of an arcuate line. The track members 28a, 28b may likewise be formed as two disks with curved surfaces 29a, 29b with which the conical surfaces 27a, 27b of the two cone parts 15a, 15b of the planet 15 are in rolling contact.

For simplicity of explanation only the minimum of moving parts have been illustrated in FIG. 12. The general concept of the mechanism is substantially the same as previously described, with the transmission ratio being determined by the separation between the two tracks parts 28a, 28b controlled by a suitable mechanism (not shown).

Referring now to FIGS. 13–17 the device shown comprises a bi-directional continuously variable transmission device for transmitting rotary drive from an input shaft 211 to an output drive member 212 illustrated as a tubular component to which, of course, an output drive shaft may be coupled by any known means.

The drive transmission device comprises inner and outer races 213, 214 each comprising axially spaced parts 213a, 213b; 214a, 214b between which roll planet members 215 circumferentially intercalated with roller follower members 216 carried on a common carrier 217 from which the output shaft 212 projects and which is borne on the input shaft 211 by a rolling element bearing 218 and on an outer casing 219 by a rolling element bearing 220.

The common carrier 217 has respective spindles 221 extending through and supporting the roller followers 216. Each spindle 221 is carried at its other end by a carrier plate 222 born on the input shaft 211 by a rolling element bearing 223. At this end the drive shaft 211 is born on the casing 219 by a rolling element bearing 224.

As can be seen in FIGS. 15 and 16, the planetary members 215 are generally spherical bodies divided into two axially separated parts by a circumferential annular groove or channel 225 into which the adjacent roller followers 216 engage in order to guide the planetary bodies 215 to turn about a rolling axis parallel to the axis of the drive shaft 211. Other than their engagement with the roller followers 216 and the races 213, 214 the planetary members 215 are unrestrained.

Contact between the planetary members 215 and the races 213, 214 takes place at two curved surface portions 226, 227 of the planetary body which, as will be appreciated from FIGS. 15 and 16 have a radius of curvature which is greater than the overall radius of the generally spherical body 215.

The radial position of the planetary body 215 is determined by the axial separation of the radially outer race parts 213a, 213b which axial separation is controlled by a screw threaded interengagement between the two race parts themselves, for which purpose the race part 13a is secured to a cylindrical sleeve 228 for rotation therewith. The screw threaded inter engagement of the two race parts is represented in FIG. 13 of the drawings by the balls 229. A Bowden cable 230 (see FIG. 17) is connected with its outer sheath engaging one of the two race members 213a, 213b and its inner cable engaged with the other such that axial forces applied between the sheath and the inner cable can cause relative turning motion of the race parts 213a, 213b. Depending on the direction of rotation of the shaft 211, this will result in axial displacement of the two race parts the rotation of which is limited by a stop 231 which engages in a recess 232 defined between end shoulders 233, 234 and a projecting head.

As will be appreciated from a consideration of FIGS. 15 and 16, relative approach of the two race parts 213a, 213b, as shown in FIG. 15, will cause the planet member 215 to be urged radially inwardly towards the axis of the shaft 211, and this causes a corresponding separation of the parts 214a, 214b of the inner race 214. The forces exerted on the planet member 215 by the inner race 214 is generated by a torque-sensitive coupling comprising a screw threaded portion of the shaft 211 engaged in correspondingly threaded portions of the parts 214a, 214b, each of the same hand and represented in the drawing by the interconnection balls 235, 236.

Axial displacement of the inner race parts 214a, 214b is limited by abutment stops 237, 238 and a priming spring 239 urges the two race parts 214a, 214b apart. Thus, depending on the direction of rotation of the shaft 211, one or other of the race parts 214a, 214b will be limited in its axial displacement by the respective axial abutment shoulder 237, 238 such that the screw-turning motion imparted to the other by the rotation of the shaft 211 will compensate the forces exerted by the choice of axial separation of the two outer race parts 213a, 213b. As illustrated in FIG. 15, with the two parts 213a, 213b closely together, the planet member 215 is urged radially inwardly such that the inner race parts 214a, 214b are urged apart so that the rolling contact of the planet member between the inner and outer races results in a low ratio in the region of 0.14:1. When the outer race parts 213a, 213b are allowed to separate by action of the cable 230 reducing the tension between the inner cable and outer sheath, the torque exerted by the shaft 211 will cause the inner race parts 214a, 214b to move towards one another increasing the transmission ratio up to a maximum of 0.62:1 as illustrated in FIG. 16. This ratio range is increased by the enlargement of the radius of curvature of the contacting surfaces, 226, 227 of the planet 215 in relation to the overall general diameter of the planet itself. The load-bearing capacity of the transmission is also increased by the presence of the channels 225 in the planets which allows a greater number of planets to be arranged within a transmission casing of given size. As illustrated in FIG. 14 it will be seen that there are five planet members in the array, intercalated with five roller followers each carried on a respective spindle 221. The effective diameter is determined by the need for the presence of the spindles 221 to transmit forces from the roller followers to the carrier. Moreover, by mounting the inner race parts 214a, 214b on a common thread axially compressive forces can be generated regardless of the direction of rotation of the drive shaft 211 as, in each case, the "trailing" race part will be urged towards the other when this contacts its respective abutment.

Turning now to FIG. 18 there is shown a transmission device in which, although still notionally continuously variable, will act to provide a number of preferential gear ratios at which the device will stop in the absence of overriding forces. The general configuration of the device illustrated in FIG. 18 is similar to that of FIG. 13 and, therefore, the same or corresponding components will not be described again. In this embodiment the planet members 215 have contact surfaces 226, 227 composed of a plurality of annular conical surfaces each having a linear generatrix to form effectively annular "facets" which therefore effectively define a given gear ratio when in contact with the corresponding contact surfaces of the race parts. FIGS. 19 to 24 illustrate the relative positions of the inner and outer race parts for the six gear ratios determined by the six annular facets of the planet members in this embodiment.

What is claimed is:

1. A continuously variable transmission device of the type having:

input and output drive members radially inner and outer races;

planetary members in rolling contact with said radially inner and outer races said inner race and said outer race each comprising two axially spaced parts connected for rotation together and relatively axially movable, and control means for selectively varying the axial separation of said two axially spaced parts of one said race and thus the radial position of the planetary members in rolling contact therewith, means sensitive to the torque applied between two drive-transmitting members of the transmission, said torque sensitive means acting both to determine the compensating variation in the separation of the two parts of the other race and thus the transmission ratio of the device and to vary the forces exchanged between the planets and the races normal to the interface between them.

2. The rolling contact continuously variable transmission device of claim 1, wherein the means for selectively varying the axial separation of the two parts of the radially inner or outer race include two adjustment members, helical interengagement means interconnecting said adjustment members such that relative turning motion of one of said adjustment members results in relative axial displacement of the other.

3. The rolling contact continuously variable transmission device of claim 1, wherein said other race is the radially inner race, and wherein the two parts of the radially inner race are carried on a shaft which is one of a drive and a driven shaft, and wherein said torque sensitive means for determining the relative separation of the two parts of the radially inner race comprise a helical interengagement means acting to react the forces exerted by the transmission of drive forces between the radially inner race and the planet members.

4. The rolling contact continuously variable transmission device of claim 1, wherein the planetary members are substantially spherical and the transmission of forces between the spherical planetary members in planetary motion and one of said drive input and output members is effected via roller follower members.

5. In combination: the rolling contact continuously variable transmission device of claim 1, and a fixed ratio epicyclic gear in the drive train to one of said input drive member and said output drive member.

6. An infinitely variable drive transmission device comprising the continuously variable transmission device of claim 1, having a further epicyclic transmission train having one of fixed ratio gears and rolling traction members in the drive train from its output drive member.

7. The continuously variable drive transmission device of claim 1, wherein the planetary members each have a circumferential annular groove, the axis of said circumferential annular groove substantially coinciding with the rolling axis about which the planetary member turns as it rolls in contact with the races, said annular grooves being engaged by roller follower members acting to guide the planetary members to maintain their orientation in their planetary motion.

8. The continuously variable drive transmission device of claim 1 wherein each planetary member has a plurality of elementary annular contact surface portions each having a substantially constant inclination to the rolling axis of the planetary member itself.

9. The continuously variable drive transmission device of claim 1, wherein the generatrix of each planetary member includes a section comprising a plurality of substantially rectilinear elementary portions.

10. The rolling contact continuously variable transmission device of claim 3, wherein in use said torque sensitive helical interengagement means reacts a direct circumferential force and an axial force having a circumferential component and said circumferential component of said axial force is substantially equal to and opposite in sign from said direct circumferential force reacted by the helical interengagement whereby to minimize the force required to be applied to said control means for selectively varying the axial separation of said two axially spaced parts of said one race to maintain or change a transmission ratio of said transmission device.

11. The continuously variable drive transmission device of claim 3, wherein said torque-sensitive means include the two axially spaced, relatively movable parts of the said other race, each said part being itself axially movable in two directional senses from a central position and engageable by limit stop means whereby to allow the transmission of rotary drive from a rotary drive input member to a rotary output member of the transmission device in each of two opposite senses of torque transmission.

12. The continuously variable drive transmission device of claim 2, wherein said helical interengagement means has thread flights which are interengaged by rolling elements.

13. The continuously variable drive transmission device of claim 11, wherein said relatively movable race parts of the torque-sensitive means are interconnected with the input drive member by a screw-thread engagement, said screw threaded engagement of each of said movable race parts being of the same hand, whereby rotary drive is transmitted when axial displacement of a race part is restrained.

14. The continuously variable drive transmission device of claim 13, wherein said two relatively variable race parts of the torque-sensitive means are oppositely axially resiliently biased.

15. The continuously variable drive transmission device of claim 13, wherein said limit stop means comprise respective abutments, said abutments being one of on, carried by, and associated with said input drive member.

16. The continuously variable drive transmission device of claim 14, wherein the resilient biasing of said two relatively movable race parts is achieved by a torsion spring acting between them.

17. The continuously variable drive transmission device of claim 13, wherein the two race parts of said one race of the transmission device, the axial separation of which is selectively variable, are each carried on a casing of the transmission device in such a way as to have a limited rotational displacement in each of two opposite rotational senses.

18. The continuously variable drive transmission device of claim 17, wherein the relative axial separation of the two race parts of said one race are achieved by a helical interengagement of at least one part of said two race parts with a fixed member of said transmission device, said two race parts both being relatively turnable with respect to said fixed member.

19. A rolling contact continuously variable transmission device having:

input and output drive members, radially inner and outer races, planetary members in rolling contact with said radially inner and outer races, said inner race and said outer race each comprising two axially spaced parts connected for rotation together and relatively axially movable, and control means for selectively varying the axial separation of said two axially spaced parts of one said race and thus the radial position of the planetary members in rolling contact therewith, means sensitive to the torque applied between two drive-transmitting members of the transmission, said torque sensitive means acting both to determine the compensating variation in the separation of the two parts of the other race and thus the transmission ratio of the device and to vary the forces exchanged between the planets and the races normal to the interface between them, wherein the means for selectively varying the axial separation of the two parts of said one race include two adjustment members, helical interengagement means interconnecting said adjustment members such that relative turning motion of one of said adjustment members results in relative axial displacement of the other, and wherein said helical interengagement means comprises a screw thread formed on the members themselves, said one of said two adjustment members being turnable through at least a limited arc of movement about a first axis and said other of said adjustment members being restrained against rotary motion at least about an axis substantially parallel to said first axis.

20. A continuously variable transmission device of the type having:

input and output drive members radially inner and outer races;

planetary members in rolling contact with said radially inner and outer races said inner race and said outer race comprising two axially spaced parts connected for rotation together and relatively axially movable, and control means for selectively varying the axial separation of said two axially spaced parts of one said race and thus the radial position of the planetary members in rolling contact therewith, means sensitive to the torque applied between two drive-transmitting members of the transmission, said torque sensitive means acting both to determine the compensating variation in the separation of the two parts of the other race and thus the transmission ratio of the device and to vary the forces exchanged between the planets and the races normal to the interface between them, wherein said torque-sensitive means include the two axially spaced, relatively movable parts of the said other race, each said part being itself axially movable in two directional senses from a central position and engageable by limit stop means whereby to allow the transmission of rotary drive from a rotary drive input member to a rotary output member of the transmission device in each of two opposite senses of torque transmission, wherein said relatively movable race parts of the torque-sensitive means are interconnected with the input drive member by a screw-thread engagement of the same hand, by which rotary drive is transmitted when axial displacement of a race part is restrained, wherein the thread flights of said helical interengagement means are interengaged by rolling elements, wherein the two race parts of said one race of the transmission device, the axial separation of which is selectively variable, are each carried on a casing of the transmission device in such a way as to have a limited rotational displacement in each of two opposite rotational senses, wherein the relative axial separation of the two race parts of said one race are achieved by a helical interengagement of at least one part of said two race parts with a fixed member of said transmission device, said two race parts both being relatively turnable with respect to said fixed member, wherein the relative turning of the two race parts of said one race is achieved by means of a Bowden cable acting between them.

21. A continuously variable transmission device of the type having:

input and output drive members radially inner and outer races;

planetary members in rolling contact with said radially inner and outer races said inner race and said outer race comprising two axially spaced parts connected for rotation together and relatively axially movable, and control means for selectively varying the axial separation of said two axially spaced parts of one said race and thus the radial position of the planetary members in rolling contact therewith, means sensitive to the torque applied between two drive-transmitting members of the transmission, said torque sensitive means acting both to determine the compensating variation in the separation of the two parts of the other race and thus the transmission ratio of the device and to vary the forces exchanged between the planets and the races normal to the interface between them, wherein the planetary members each have a circumferential annular groove, the axis of said circumferential annular groove substantially coinciding with the rolling axis about which the planetary member turns as it rolls in contact with the races, said annular grooves being engaged by roller follower members acting to guide the planetary members to maintain their orientation in their planetary motion.

22. A continuously variable transmission device of the type having:

input and output drive members radially inner and outer races;

planetary members in rolling contact with said radially inner and outer races each said race comprising two axially spaced parts, and control means for selectively varying the axial separation of said two axially spaced parts of one said race and thus the radial position of the planetary members in rolling contact therewith, means sensitive to the torque applied between two drive-transmitting members of the transmission, said torque sensitive means acting both to determine the compensating variation in the separation of the two parts of the other race and thus the transmission ratio of the device and to vary the forces exchanged between the planets and the races normal to the interface between them, wherein each planetary member has a plurality of elementary annular contact surface portions each having a substantially constant inclination to the rolling axis of the planetary member itself.

23. A continuously variable transmission device of the type having:

input and output drive members radially inner and outer races;

planetary members in rolling contact with said radially inner and outer races said inner race and said outer race comprising two axially spaced parts connected for rotation together and relatively axially movable, and control means for selectively varying the axial separation of said two axially spaced parts of one said race and thus the radial position of the planetary members in rolling contact therewith, means sensitive to the torque applied between two drive-transmitting members of the transmission, said torque sensitive means acting both to determine the compensating variation in the separation of the two parts of the other race and thus the transmission ratio of the device and to vary the forces exchanged between the planets and the races normal to the interface between them, wherein the generatrix of each planetary member includes a section comprising a plurality of substantially rectilinear elementary portions.

24. The continuously variable drive transmission drive of claim 23, wherein the races have respective contact surfaces for rolling contact with the planetary members, each having correspondingly inclined elementary annular contact surface portions substantially matching those of the planetary members.

25. A continuously variable drive transmission device of the type having:

input and output drive members, radially inner and outer races, planetary members in rolling contact with said radially inner and outer races, said inner race and said outer race each comprising two axially spaced parts connected for rotation together and relatively axially movable, and control means for selectively varying the axial separation of said two axially spaced parts of one said race and thus the radial position of the planetary members in rolling contact therewith, means sensitive to the torque applied between two drive-transmitting members of the transmission, said torque sensitive means acting both to determine the compensating variation in the separation of the two parts of the other race and thus the transmission ratio of the device and to vary the forces exchanged between the planets and the races normal to the interface between them, wherein the relative axial separation of the two race parts of said one race is achieved by a helical interengagement of at least one part of said two race parts with a fixed member of said transmission device, said two race parts both being relatively turnable with respect to said fixed member, and wherein the relative turning of the two race parts of said one race is achieved by means of a Bowden cable acting between them.

26. A rolling contact continuously variable transmission device of the type having:

input and output drive members radially inner and outer races;

planetary members in rolling contact with said radially inner and outer races said inner race and said outer race each comprising two axially spaced parts connected for rotation together and relatively axially movable, and control means for selectively varying the axial separation of said two axially spaced parts of one said race and thus the radial position of the planetary members in rolling contact therewith, means sensitive to the torque applied between two drive-transmitting members of the transmission, said torque sensitive members of the transmission, said torque sensitive means acting both to determine the compensating variation in the separation of the two parts of the other race and thus the transmission ratio of the device and to vary the forces exchanged between the planets and the races normal to the interface between them, wherein said other race is the radially inner race, and wherein the two parts of the radially inner race are carried on a shaft which is one of a drive and a driven shaft, and wherein said torque sensitive means for determining the relative separation of the two parts of the radially inner race comprise a helical interengagement means acting to react the forces exerted by the transmission of drive forces between the radially inner race and the planet members; and wherein in use said torque sensitive helical interengagement means reacts a direct circumferential force and an axial force having a circumferential component and said circumferential component of said axial force is substantially equal to and opposite in sign from said direct circumferential force reacted by the helical interengagement whereby to minimize the force required to be applied to said control means for selectively varying the axial separation of said two axially spaced parts of said one race to maintain or change a transmission ratio of said transmission device.

* * * * *